United States Patent
Abe et al.

(10) Patent No.: US 11,623,693 B2
(45) Date of Patent: Apr. 11, 2023

(54) VEHICLE BODY

(71) Applicant: Honda Motor Co., Ltd., Tokyo (JP)

(72) Inventors: Takeshi Abe, Saitama (JP); Yu Iemura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/207,744

(22) Filed: Mar. 22, 2021

(65) Prior Publication Data

US 2021/0291910 A1  Sep. 23, 2021

(30) Foreign Application Priority Data

Mar. 23, 2020 (JP) .............................. JP2020-051771

(51) Int. Cl.
    *B62D 25/04* (2006.01)
    *B62D 21/15* (2006.01)
    *B62D 25/02* (2006.01)

(52) U.S. Cl.
    CPC ........... *B62D 25/04* (2013.01); *B62D 21/157* (2013.01); *B62D 25/025* (2013.01)

(58) Field of Classification Search
    CPC .............................. B62D 25/04; B62D 21/157
    USPC ....................................... 296/193.06, 187.12
    See application file for complete search history.

(56) References Cited

FOREIGN PATENT DOCUMENTS

| CN | 101626941 | 1/2010 |
|---|---|---|
| CN | 101817368 | 9/2010 |
| CN | 101827744 | 9/2010 |
| CN | 102198843 | 9/2011 |
| DE | 102012015463 | 2/2014 |

OTHER PUBLICATIONS

"Office Action of China Counterpart Application", dated Nov. 30, 2022, with English translation thereof, pp. 1-13.

*Primary Examiner* — Dennis H Pedder
(74) *Attorney, Agent, or Firm* — JCIPRNET

(57) ABSTRACT

The disclosure provides a vehicle body capable of suppressing the occurrence of cracks in a center pillar at the time of a side collision. A center pillar stiffener forms a hollow structure with a closed cross section by including a side wall which faces the outer surface of a pillar inner, a front wall which is formed by bending from a front end of the side wall to form a first ridge with the side wall and which is joined to the outer surface of the pillar inner, and a rear wall which is formed by bending from a rear end of the side wall to form a second ridge with the side wall and which is joined to the outer surface of the pillar inner. The pillar stiffener is provided with a bead recessed toward the pillar inner and orthogonal to the first and second ridges.

4 Claims, 5 Drawing Sheets

VEHICLE BODY

CROSS-REFERENCE TO RELATED APPLICATION

This application claims the priority benefit of Japan application serial no. 2020-051771, filed on Mar. 23, 2020. The entirety of the above-mentioned patent application is hereby incorporated by reference herein and made a part of this specification.

BACKGROUND

Technical Field

The disclosure relates to a vehicle body including a pillar inner which is located at a boundary between a front door and a rear door and which forms a center pillar connected from a roof to a side sill, and a pillar stiffener which is overlapped with the outer surface of the pillar inner and joined to the pillar inner to reinforce the bending strength of the center pillar.

Description of Related Art

Patent Document 1 discloses a center pillar located at a boundary between a front door and a rear door and connected from a roof to a side sill. The center pillar includes a pillar inner and a pillar stiffener which is overlapped with the outer surface of the pillar inner and joined to the pillar inner. The pillar stiffener has a side wall facing the outer surface of the pillar inner, a front wall formed by bending from the front end of the side wall to form a first ridge with the side wall, and a rear wall formed by bending from the rear end of the side wall to form a second ridge with the side wall. The pillar inner, the front wall, the side wall and the rear wall form a hollow structure with a closed cross section. The pillar stiffener reinforces the bending strength of the center pillar. The first ridge and the second ridge are connected to the side sill while gradually moving away from each other.

RELATED ART

Patent Document

[Patent Document 1] German Patent Publication No. 102012015463

The pillar stiffener is provided with a groove extending in the horizontal direction and crossing the first ridge and the second ridge. At the time of a side collision, the center pillar is bent due to the action of the groove, and the impact is absorbed. However, since the lengths of the first ridge and the second ridge divided by the groove are different, the amount of elongation differs between the front side and the rear side of the side wall, and there is a possibility that the pillar stiffener may crack.

The disclosure provides a vehicle body capable of suppressing the occurrence of cracks in the center pillar at the time of a side collision.

SUMMARY

According to a first aspect of the disclosure, a vehicle body includes a pillar inner which is located at a boundary between a front door and a rear door and which forms a center pillar connected from a roof to a side sill, and a pillar stiffener which is overlapped with an outer surface of the pillar inner and joined to the pillar inner to reinforce a bending strength of the center pillar. The pillar stiffener forms a hollow structure with a closed cross section by including a side wall which faces the outer surface of the pillar inner, a front wall which is formed by bending from a front end of the side wall to form a first ridge with the side wall and which is joined to the outer surface of the pillar inner, and a rear wall which is formed by bending from a rear end of the side wall to form a second ridge with the side wall and which is joined to the outer surface of the pillar inner. The pillar stiffener is provided with a bead which is recessed toward the pillar inner and which is orthogonal to the first ridge and the second ridge.

DESCRIPTION OF THE EMBODIMENTS

Figure 1:
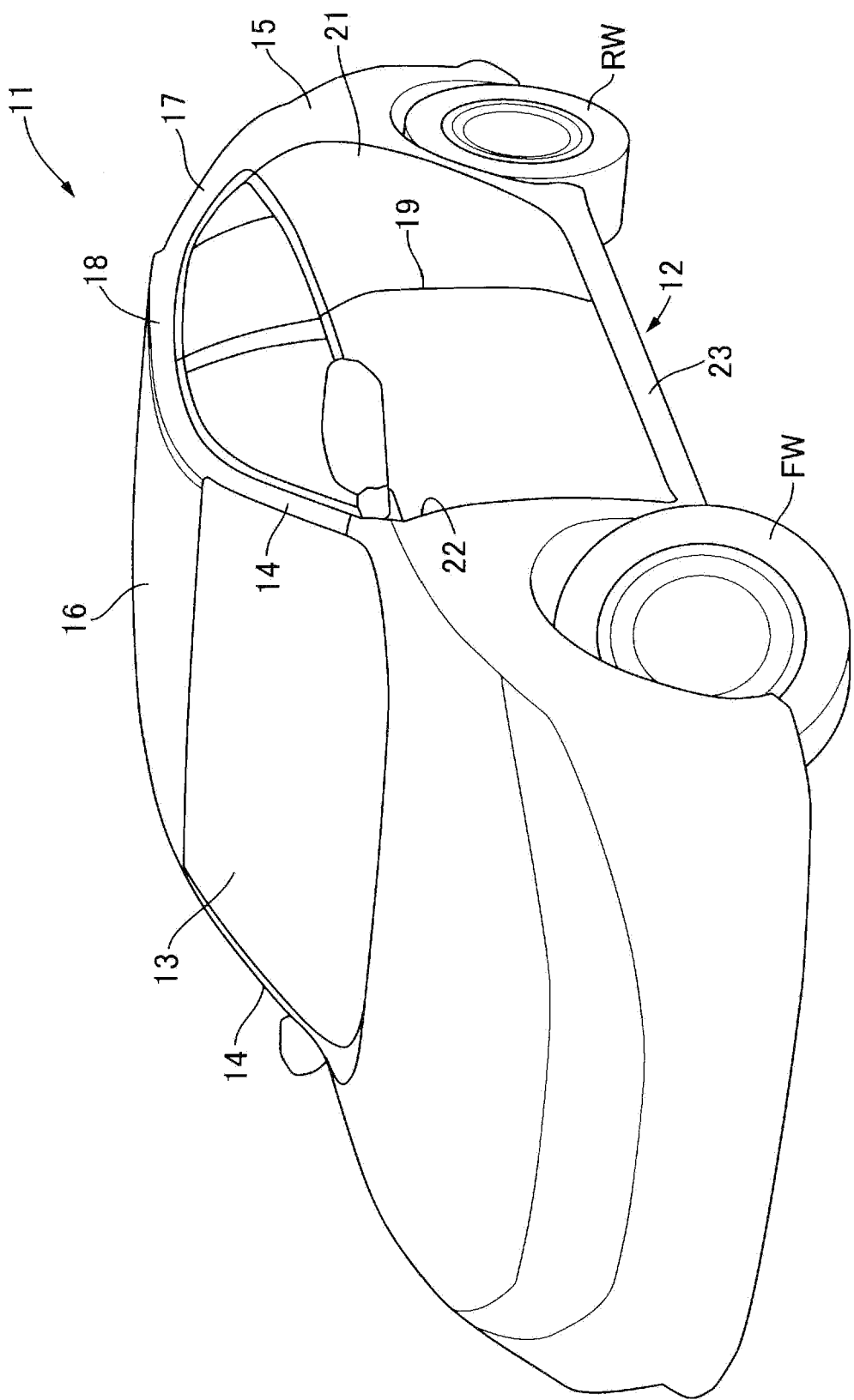
FIG. 1 is a perspective view schematically showing an entire vehicle according to an embodiment of the disclosure.

According to a second aspect, in addition to the configuration of the first aspect, the bead includes a first groove which extends linearly along the side wall across the first ridge, and a second groove which is continuous from the first groove and which extends linearly along the side wall across the second ridge.

According to a third aspect, in addition to the configuration of the second aspect, the bead is connected to the front wall in a curve with a curvature that becomes smaller when approaching a center line of the first groove, and is connected to the rear wall in a curve with a curvature that becomes smaller when approaching a center line of the second groove.

According to a fourth aspect, in addition to the configuration of the second aspect, the bead includes a first curved region which extends forward with respect to a front end of a bottom wall and which is connected to the front wall by a first connecting line drawn with a curvature smaller than a curvature of the bottom wall, and a second curved region which extends rearward with respect to a rear end of the bottom wall and which is connected to the rear wall by a second connecting line drawn with a curvature smaller than the curvature of the bottom wall.

According to a fifth aspect, in addition to the configuration of the second aspect, the bead includes a recess which is recessed from a bottom wall toward the pillar inner and which extends downward from the side wall on the upper side with respect to the bead.

According to the first aspect, since the bead crosses the first ridge and the second ridge of the pillar stiffener, at the time of a side collision, the center pillar is bent due to the action of the bead, and the impact is absorbed. At this time, since the bead is orthogonal to the first ridge and the second ridge, respectively, the amount of elongation of the first ridge and the second ridge deformed by the bead may be equalized. The amount of elongation is equalized on the front side and the rear side of the side wall. The occurrence of cracks may be suppressed (avoided) by the pillar stiffener.

According to the second aspect, since the bead is formed by the combination of the linear first groove and the linear second groove, it may be relatively easy to ensure the orthogonality of the bead with respect to the non-parallel first ridge and second ridge. It may be easily applied to changes in vehicle types and parts. High versatility may be established.

According to the third aspect, although the bead is opened by the front wall and the rear wall of the pillar stiffener, the bead is connected to the front wall by a curve and may avoid forming a ridge with the front wall. Similarly, the bead is connected to the rear wall by a curve and may avoid forming a ridge with the rear wall. As a result, the bead does not hinder the bending deformation at the time of a side collision.

According to the fourth aspect, although the bead is opened by the front wall and the rear wall of the pillar stiffener, the bead is connected to the front wall by a first curved region and may avoid forming a ridge with the front wall. Similarly, the bead is connected to the rear wall by a second curved region and may avoid forming a ridge with the rear wall. As a result, the bead does not hinder the bending deformation at the time of a side collision.

According to the fifth aspect, the recess forms the ridge which extends in the vertical direction from the side wall on the upper side. The bending strength of the bottom wall in the vertical direction may be increased by the action of the ridge. As a result, at the time of a side collision, the bottom wall on the upper side with respect to the center line of the first groove and the center line of the second groove may retain its shape. In this way, bending deformation may be realized along the center line of the first groove and the center line of the second groove. The position of bending deformation may be controlled by the action of the recess formed in the bottom wall.

Hereinafter, embodiments of the disclosure will be described with reference to the accompanying drawings. Here, the up, down, front, rear, left, and right of the vehicle body are defined based on the viewpoint of an occupant who is on the vehicle.

FIG. 1 schematically shows an entire vehicle according to an embodiment of the disclosure. A vehicle 11 includes a vehicle body 12 which is supported so as to travel freely by left and right front wheels FW and left and right rear wheels RW. The vehicle body 12 has front pillars 14 which define the side edges of a windshield 13, left and right side outer panels 15 which form the left and right outer surfaces, and a roof 16 which defines the upper edge of the windshield 13 and connects the upper ends of the left and right side outer panels 15. The side outer panel 15 has a roof side rail 18 which is continuous from the rear end of the front pillar 14 and extends rearward to be connected to a rear pillar 17. The left and right edges of the roof 16 are combined to the roof side rails 18.

Figure 2:
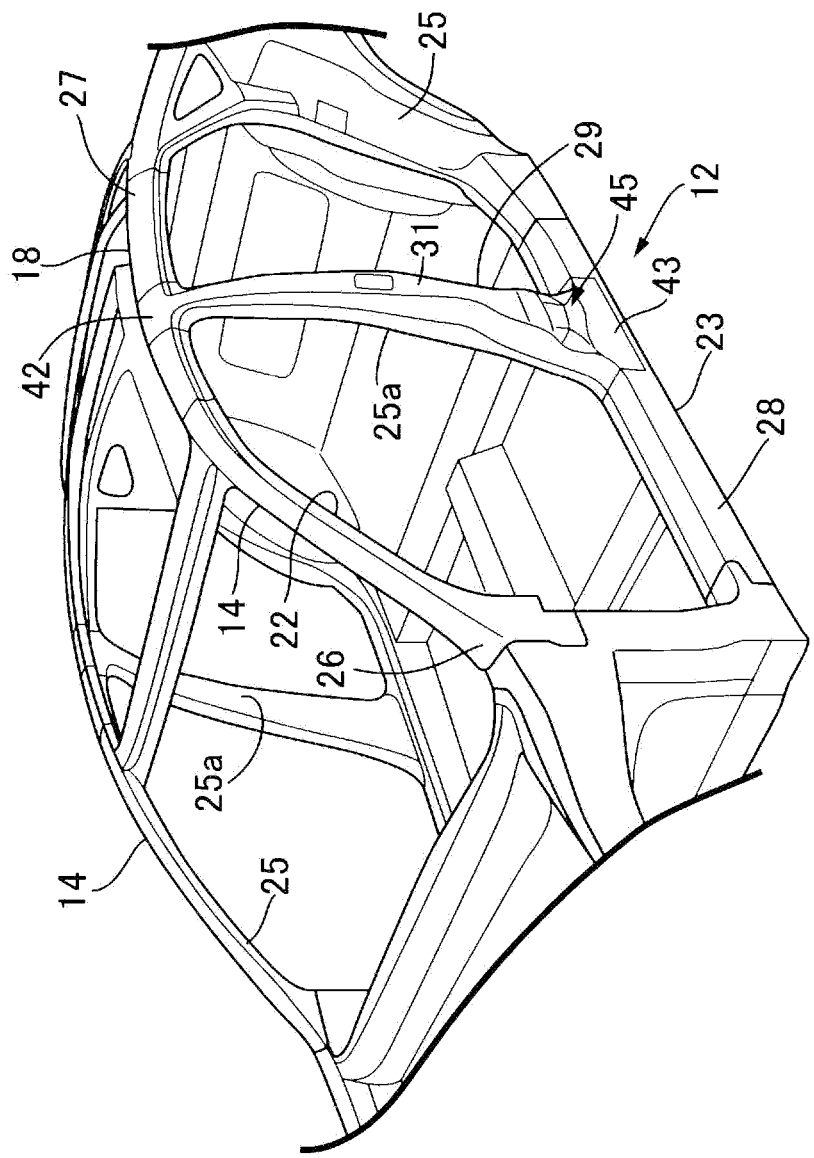
FIG. 2 is a perspective view schematically showing a skeleton of a vehicle body with the side outer panel removed.

The side outer panel 15 is provided with a door opening 22 which accommodates a front side door 19 and a rear side door 21 below the roof side rail 18. The lower end of the door opening 22 is defined by a side sill 23. As shown in FIG. 2, the vehicle body 12 further includes a side inner panel 25 which is covered by the side outer panel 15 from the outside and which defines the door opening 22, a front pillar upper stiffener 26 which is joined to the side inner panel 25 at the position of the front pillar 14 to reinforce the bending strength of the front pillar 14, a roof side stiffener 27 which is joined to the side inner panel 25 at the position of the roof side rail 18 to reinforce the bending strength of the roof side rail 18, and a side sill reinforcing member 28 which is joined to the side inner panel 25 at the position of the side sill 23 to reinforce the bending strength of the side sill 23. The side inner panel 25 includes a center pillar inner 25a which is located at a boundary between the front side door 19 and the rear side door 21 and which forms a center pillar 29 connected from the roof 16 to the side sill 23. A center pillar stiffener 31 is overlapped with and joined to the outer surface of the center pillar inner 25a. The center pillar stiffener 31 reinforces the bending strength of the center pillar 29. The rear side door 21 is connected to the center pillar 29 so as to be swingable around an axis extending in the vertical direction. A hinge that supports the rear side door 21 is fixed to the center pillar stiffener 31 for connection.

Figure 3:
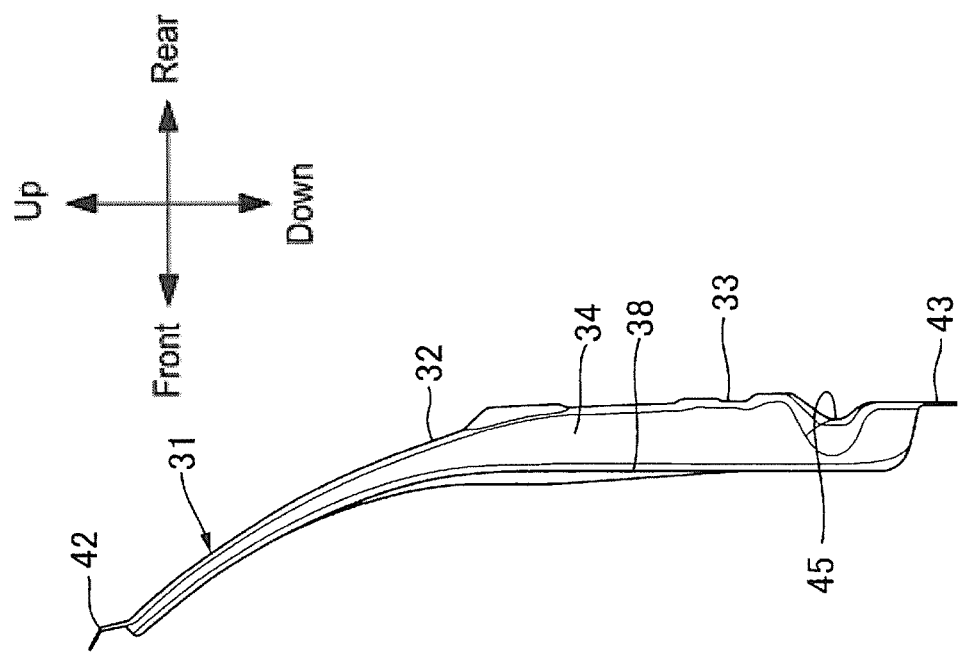
FIG. 3 shows a side view (A) and a front view (B) of the center pillar stiffener.
Figure 3:
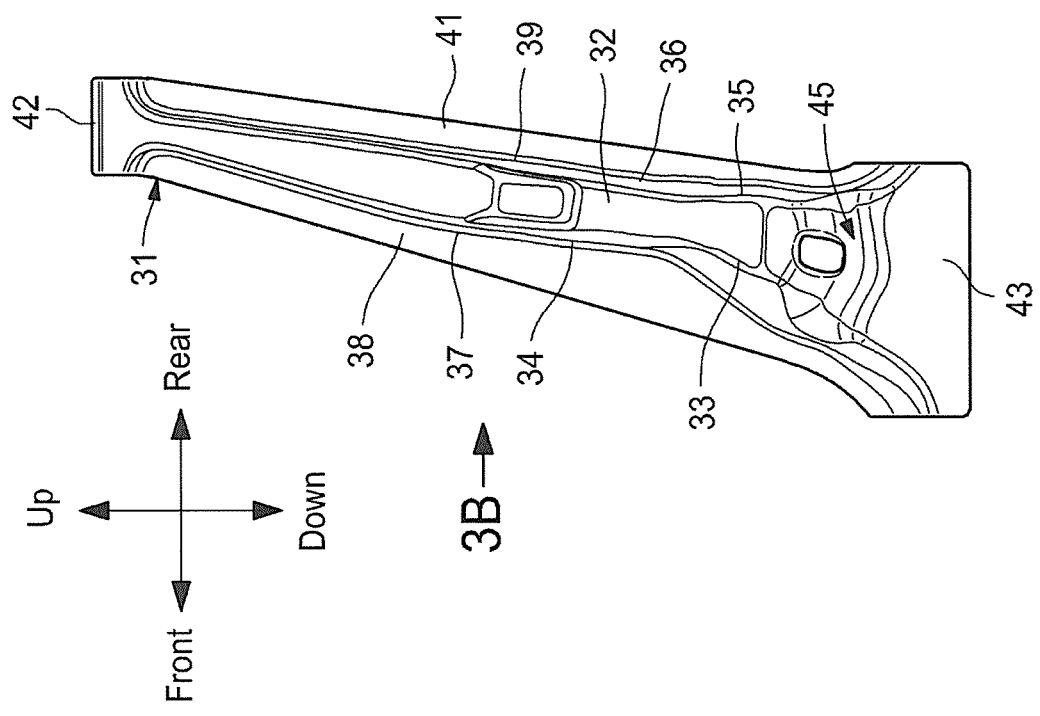

As shown in FIG. 3, the center pillar stiffener 31 has a side wall 32 which extends in the vertical direction between the roof side rail 18 and the side sill 23 while facing the outer surface of the center pillar inner 25a, a front wall 34 which is formed by bending inward from the front end of the side wall 32 to form a first ridge 33 with the side wall 32 and is joined to the outer surface of the center pillar inner 25a, and a rear wall 36 which is formed by bending inward from the rear end of the side wall 32 to form a second ridge 35 with the side wall 32 and is joined to the outer surface of the center pillar inner 25a. The front wall 34 is continuously provided with a front overlap space 38 which is formed by bending forward from the inner end of the front wall 34 to form a third ridge 37 with the front wall 34 and which is overlapped with the outer surface of the center pillar inner 25a. The rear wall 36 is continuously provided with a rear overlap space 41 which is formed by bending rearward from the inner end of the rear wall 36 to form a fourth ridge 39 with the rear wall 36 and which is overlapped with the outer surface of the center pillar inner 25a. The front wall 34 is joined to the outer surface of the center pillar inner 25a by joining the front overlap space 38 to the outer surface of the center pillar inner 25a. For example, welding may be used for joining. Similarly, the rear wall 36 is joined to the outer surface of the center pillar inner 25a by joining the rear overlap space 41 to the outer surface of the center pillar inner 25a. For example, welding may be used for joining. The upper end of the side wall 32 is continuously provided with an upper wall 42 which is overlapped with the outer surface of the roof side stiffener 27 and which is joined to the outer surface of the roof side stiffener 27. For example, welding may be used for joining. The lower end of the side wall 32 is continuously provided with a lower wall 43 which is overlapped with the outer surface of the side sill reinforcing member 28 and which is joined to the outer surface of the side sill reinforcing member 28. For example, welding may be used for joining. A hollow structure with a closed cross section is formed by the center pillar inner 25a, the front wall 34, the side wall 32 and the rear wall 36. The bending strength of the center pillar 29 in the vertical direction may be increased by the action of the first ridge 33, the second ridge 35, the third ridge 37 and the fourth ridge 39. The center pillar stiffener 31 may be molded by hot stamping from, for example, a metal material (high-strength steel plate). Here, the entire center pillar stiffener 31 is rapidly cooled and quenched during hot stamping. No partial softening treatment based on room temperature cooling is performed.

The upper end of the first ridge 33 extends forward in the horizontal direction and continues to the ridge of the roof side stiffener 27. The upper end of the second ridge 35 extends rearward in the horizontal direction and continues to the ridge of the roof side stiffener 27. The first ridge 33 and the second ridge 35 extend non-parallelly while moving away from each other to reach the side sill reinforcing member 28. Therefore, on the side wall 32 adjacent to the side sill 23, a downwardly widening contour line is defined by the first ridge 33 and the second ridge 35.

Figure 4:
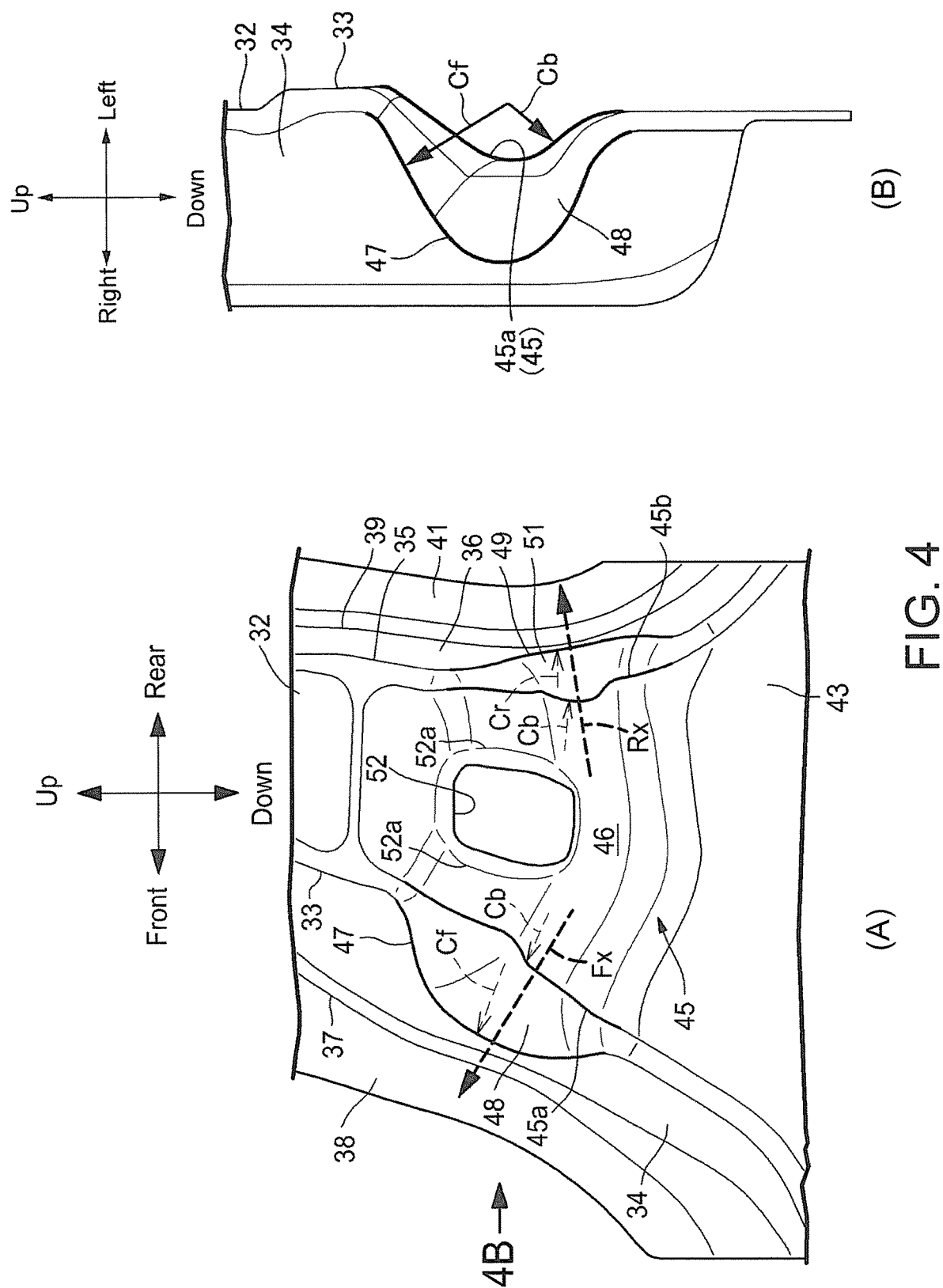
FIG. 4 shows an enlarged partial side view (A) and an enlarged partial front view (B) of the center pillar stiffener showing the shape of the bead.

As shown in FIG. 4, the center pillar stiffener 31 is provided with a bead 45 which is recessed toward the center pillar inner 25a and which is orthogonal to the first ridge 33 and the second ridge 35. The bead 45 has a first groove 45a which extends linearly along the side wall 32 across the first ridge 33, and a second groove 45b which is continuous from the rear end of the first groove 45a and which extends linearly along the side wall 32 across the second ridge 35. The first groove 45a extends with a constant width along a center line Fx. The front end of the first groove 45a is opened by the front wall 34. The second groove 45b extends with a constant width along a center line Rx. The rear end of the second groove 45b is opened by the rear wall 36.

The bead 45 has a first curved region 48 which extends forward with respect to the front end of a bottom wall 46 and which is connected to the front wall 34 by a first connecting line 47 drawn with a curvature Cf smaller than the curvature Cb of the bottom wall 46, and a second curved region 51 which extends rearward with respect to the rear end of the bottom wall 46 and which is connected to the rear wall 36 by a second connecting line 49 drawn with a curvature Cr smaller than the curvature Cb of the bottom wall 46. Here, in the first curved region 48, the bottom wall 46 is connected to the front wall 34 in a curve with a curvature that becomes smaller when approaching the center line Fx of the first groove 45a. Therefore, the first curved region 48 expands in the front-rear direction when approaching the center line Fx. In the second curved region 51, the bottom wall 46 is connected to the rear wall 36 in a curve with a curvature that becomes smaller when approaching the center line Rx of the second groove 45b. The second curved region 51 expands in the front-rear direction when approaching the center line Rx.

The bead 45 is provided with a recess 52 which is recessed from the bottom wall 46 toward the center pillar inner 25a and which extends downward from the side wall 32 on the upper side with respect to the bead 45. The recess 52 forms a ridge 52a which extends in the vertical direction from the side wall 32 on the upper side. The bending strength of the bottom wall 46 in the vertical direction is increased by the action of the ridge 52a.

Figure 5:
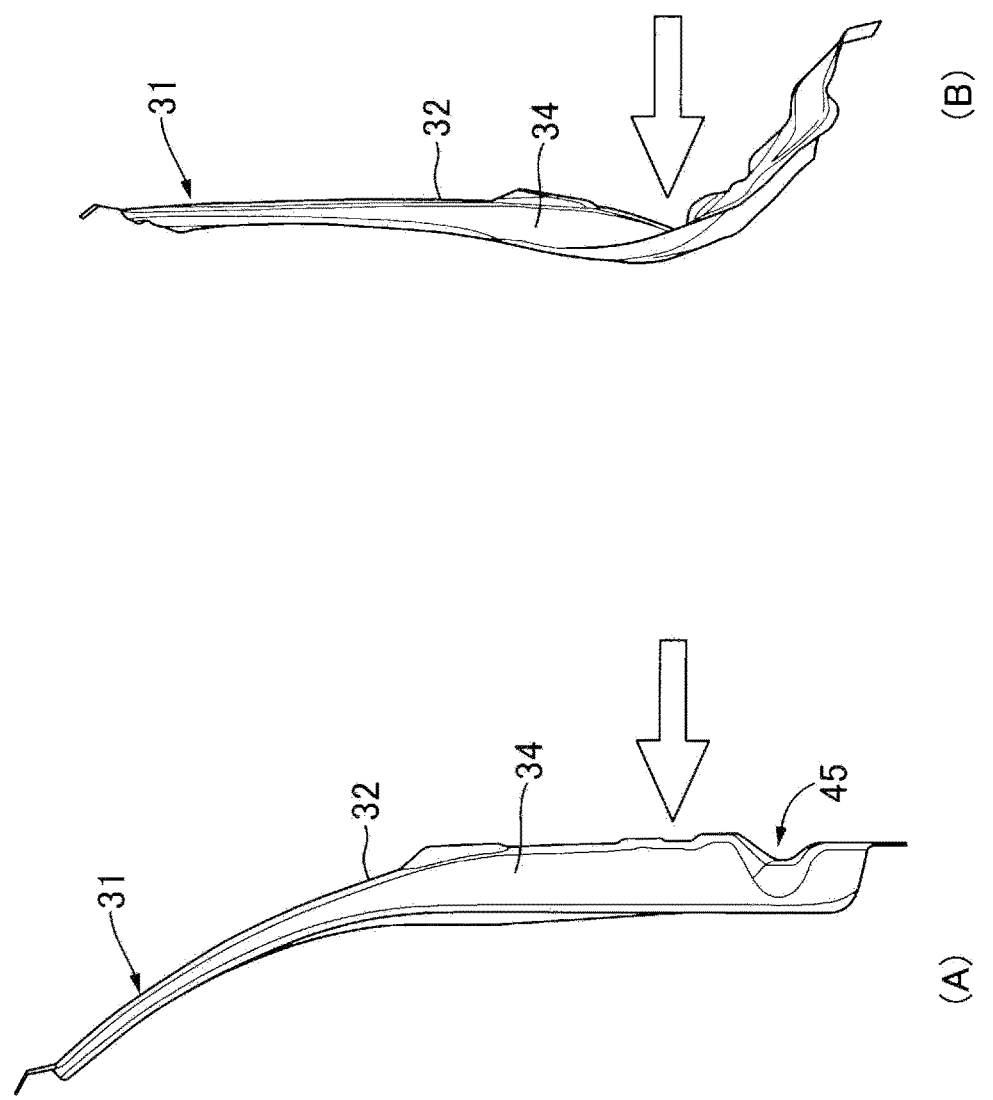
FIG. 5 shows conceptual views schematically showing the deformation of the center pillar stiffener at the time of a side collision.

As shown in FIG. 5, the center pillar stiffener 31 is crushed and bent inward by the action of the bead 45 at the time of a side collision. The impact of the collision may be absorbed by the center pillar 29 according to the deformation of the center pillar stiffener 31. At this time, since the bead 45 is orthogonal to the first ridge 33 and the second ridge 35, respectively, the amount of elongation of the first ridge 33 and the second ridge 35 deformed by the bead 45 may be equalized. The amount of elongation is equalized on the front side and the rear side of the side wall 32. The occurrence of cracks may be suppressed (avoided) by the center pillar stiffener 31.

Here, the bead 45 has the first groove 45a which extends linearly along the side wall 32 across the first ridge 33, and the second groove 45b which is continuous from the first groove 45a and which extends linearly along the side wall 32 across the second ridge 35. Since the bead 45 is formed by the combination of the linear first groove 45a and the linear second groove 45b, it may be relatively easy to ensure the orthogonality of the bead with respect to the non-parallel first ridge 33 and second ridge 35. It may be easily applied to changes in vehicle types and parts. High versatility may be established.

The bead 45 according to the embodiment is connected to the front wall 34 in a curve with a curvature that becomes smaller when approaching the center line Fx of the first groove 45a, and is connected to the rear wall 36 in a curve with a curvature that becomes smaller when approaching the center line Rx of the second groove 45b. Although the bead 45 is opened by the front wall 34 and the rear wall 36 of the center pillar stiffener 31, the bead 45 is connected to the front wall 34 by a curve and may avoid forming a ridge with the front wall 34. Similarly, the bead 45 is connected to the rear wall 36 by a curve and may avoid forming a ridge with the rear wall 36. As a result, the bead 45 does not hinder the bending deformation at the time of a side collision.

Here, the bead 45 has the first curved region 48 which extends forward with respect to the front end of the bottom wall 46 and which is connected to the front wall 34 by the first connecting line 47 drawn with the curvature Cf smaller than the curvature Cb of the bottom wall 46, and the second curved region 51 which extends rearward with respect to the rear end of the bottom wall 46 and which is connected to the rear wall 36 by the second connecting line 49 drawn with the curvature Cr smaller than the curvature Cb of the bottom wall 46. Although the bead 45 is opened by the front wall 34 and the rear wall 36 of the center pillar stiffener 31, the bead 45 is connected to the front wall 34 by the first curved region 48 and may avoid forming a ridge with the front wall 34. Similarly, the bead 45 is connected to the rear wall 36 by the second curved region 51 and may avoid forming a ridge with the rear wall 36. As a result, the bead 45 does not hinder the bending deformation at the time of a side collision.

In the embodiment, the bead 45 has the recess 52 which is recessed from the bottom wall 46 toward the center pillar inner 25a and which extends downward from the side wall 32 on the upper side with respect to the bead 45. The recess 52 forms the ridge 52a which extends in the vertical direction from the side wall 32 on the upper side. The bending strength of the bottom wall 46 in the vertical direction may be increased by the action of the ridge 52a. As a result, at the time of a side collision, the bottom wall 46 on the upper side with respect to the center line Fx of the first groove 45a and the center line Rx of the second groove 45b may retain its shape. In this way, bending deformation may be realized along the center line Fx of the first groove 45a and the center line Rx of the second groove 45b. The position of bending deformation may be controlled by the action of the recess 52 formed in the bottom wall 46.

What is claimed is:
1. A vehicle body comprising:
a pillar inner which is located at a boundary between a front door and a rear door and which forms a center pillar connected from a roof to a side sill; and
a pillar stiffener which is overlapped with an outer surface of the pillar inner and joined to the pillar inner to reinforce a bending strength of the center pillar,
wherein the pillar stiffener forms a hollow structure with a closed cross section by comprising:
a side wall which faces the outer surface of the pillar inner;
a front wall which is formed by bending from a front end of the side wall and joined to the outer surface of the pillar inner, and a first ridge extending along a direction from the roof to the side sill is formed at a junction of the front wall and the side wall; and a rear wall which is formed by bending from a rear end of the side wall and joined to the outer surface of the pillar inner, and a second ridge extending along the direction from the roof to the side sill is formed at a junction of the rear wall and the side wall, wherein the pillar stiffener is provided with a bead which is recessed toward the pillar inner and extended across the first ridge and the second ridge, and the bead comprises:

a first groove which extends straightly on the side wall across the first ridge; and a second groove which is continuous from the first groove and which extends straightly on the side wall across the second ridge.

2. The vehicle body according to claim 1, wherein the first groove is provided with a first center line where a curvature of the first groove becomes smaller when approaching the first center line, and the second groove is provided with a second center line where a curvature of the second groove becomes smaller when approaching the second center line.

3. The vehicle body according to claim 1, wherein the bead comprises:

a bottom wall provided with the first groove and the second groove thereon;

a first curved region which extends forward with respect to a front end of the bottom wall and connected to the front wall by a first connecting line drawn with a curvature smaller than a curvature of the bottom wall; and a second curved region which extends rearward with respect to a rear end of the bottom wall and connected to the rear wall by a second connecting line drawn with a curvature smaller than the curvature of the bottom wall.

4. The vehicle body according to claim 1, wherein the bead comprises:

a bottom wall provided with the first groove and the second groove thereon; and a recess which is recessed from the bottom wall toward the pillar inner and forms a third ridge which extends along the direction from the roof to the side sill.

* * * * *